United States Patent

Lochkovic et al.

[11] Patent Number: 5,561,730
[45] Date of Patent: Oct. 1, 1996

[54] CABLE CONTAINING FIBER RIBBONS WITH OPTIMIZED FRICTIONAL PROPERTIES

[75] Inventors: Gregory A. Lochkovic, Newton; John R. Keesee; Christopher K. Eoll, both of Hickory; Gregory A. Mills, Claremont, all of N.C.

[73] Assignee: Siecor Corporation, Hickory, N.C.

[21] Appl. No.: 392,566

[22] Filed: Feb. 23, 1995

[51] Int. Cl.⁶ .................................................. G02B 6/44
[52] U.S. Cl. ........................ 385/114; 385/110; 385/128
[58] Field of Search ..................................... 385/100, 103, 385/104, 105, 110, 111, 114, 128, 141

[56] References Cited

U.S. PATENT DOCUMENTS

| | | | |
|---|---|---|---|
| 4,709,984 | 12/1987 | Oestreich et al. | 385/114 |
| 4,741,958 | 5/1988 | Bishop | 385/128 X |
| 4,861,135 | 8/1989 | Rohner et al. | 385/114 |
| 4,900,126 | 2/1990 | Jackson et al. | 385/114 |
| 4,953,945 | 9/1990 | Nishimura et al. | 385/114 |
| 5,082,347 | 1/1992 | Akasaka et al. | 385/114 |
| 5,146,531 | 9/1992 | Shustack | 385/128 |
| 5,212,756 | 5/1993 | Eoll | 385/114 |
| 5,224,191 | 6/1993 | Zeidler | 385/111 |
| 5,457,762 | 10/1995 | Lochkovic et al. | 385/114 |

FOREIGN PATENT DOCUMENTS 62-89915  4/1987  Japan .

OTHER PUBLICATIONS

Design & Qualification of Optical Fiber Coating for Ribbon Fiber N. Akasaka, W. Katsurashima, T. Nonaka, T. Hattori, Y. Matsuda International Wire & Cable Symposium Proceedings 1992, pp. 428–434. [No Month].

A Comprehensive Approach to Ribbon Design with a Focus on Materials John R. Keesee & Gregory A. Lochkovic, David Smith & J. Richard Toler International Wire & Cable Symposium Proceedings 1994, pp. 430–439. [No Month].

*Primary Examiner*—John D. Lee
*Attorney, Agent, or Firm*—J. David Abernethy

[57] ABSTRACT

In a ribbon type fiber optic cable there is disposed a stack of fiber optic ribbons, each composed of a set of individually coated optical fibers in a planar relationship to one another with the set of coated optical fibers also coated by a common coating of ultraviolet light cured material. The coefficient of friction between adjacent ribbons in a stack is equal to or less than 0.70.

22 Claims, 4 Drawing Sheets

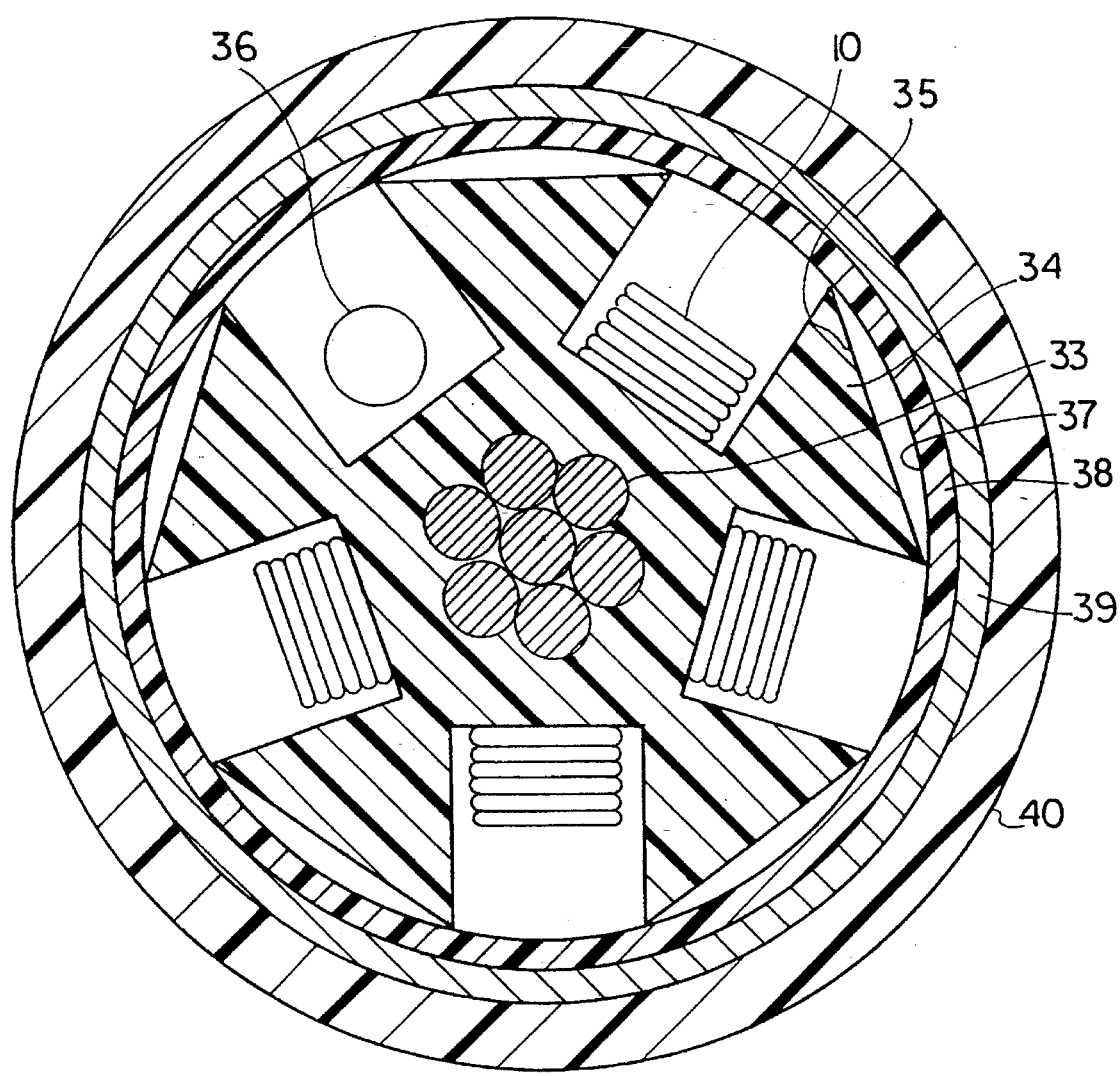

CABLE CONTAINING FIBER RIBBONS WITH OPTIMIZED FRICTIONAL PROPERTIES

BACKGROUND OF THE INVENTION

The invention relates to fiber optic ribbon type cable.

Excess fiber attenuation in optical fiber ribbon stacks has been a continuing problem to cablers. Optical fibers in ribbon form are made by disposing a plurality of optical fibers, with each optical fiber normally having its own individual plastic coating, in planar relationship one to another and then circumscribing the planar array with a common plastic matrix coating. A plurality of ribbons are arranged in a stack and a stack is then placed in a compartment such as a core tube, a groove in a slotted core type of structure, or a "U" shaped member stranded about a central member. When fiber optic cables containing stacks of ribbons were bent, installed/rewound and/or thermally cycled, it was found that the attenuation of certain fibers increased, especially the corner fibers. By corner fibers in the stack it is meant the four corners of the ribbon stack when viewed in cross section.

From the above observation it was concluded that the optical fiber ribbon plastic matrix to plastic matrix coefficient of friction was critical in order to enable the ribbons to slide easily, relative to one another. It is toward the solution to the problem of insufficient sliding that the invention is directed.

While Zeidler, U.S. Pat. No. 5,224,191, teaches the addition of powders or filling compounds to enhance ribbon sliding, it is believed that reducing ribbon friction without external sliding agents is needed, as cables not having filling compounds are desirable in some applications, such as for indoor cables.

Coating materials having a low modulus of elasticity generally have the disadvantage of having a high coefficient of friction.

European Patent Application 194,891 discloses an optical ribbon in which the same material, DESOLITE 950-075, serves as the coating on each of the individual optical fibers and also serves as the common bonding coating. Such material is described to be an ultraviolet-curable epoxyacrylate having a low tensile modulus. Such material is specified to have a secant modulus of 2.2 MPa at 2.5% strain according to product literature as published by its manufacturer.

Japanese laid-open publication 62-89915, published in 1987, discloses a slotted core optical cable having ribbon stacks comprising individual optical fiber ribbons each having an outer common coating having a static friction coefficient of 0.9 or less, such as Teflon or nylon, applied to the exterior of an inner common coating formed of ultraviolet curable resin. One such outer common coating is slated to have a static coefficient of friction of 0.65. However, making such a cable involves an additional coating step and the manufacturer must be assured of proper adhesion and material compatibility between the inner and outer common coating layers.

SUMMARY OF THE INVENTION

The invention comprises a fiber optic cable employing an optical ribbon stack in a tube, or with either a slotted core or "U" shaped members disposed around a central member or stranded tubes containing ribbons. A slotted core cable is one that comprises a member in which there are one or more grooves. Usually the central member is composed of a metallic or glass-reinforced plastic strength member about which a plastic coating is extruded in which there are one or more helical or alternating lay grooves. In each such groove there is disposed a stack of fiber optic ribbon subunits, which consist of a plurality of contacting tape-shaped ribbon subunits each composed of a plurality of optical fibers in planar relationship one to another surrounded by a coating of ultraviolet light cured material. The coefficient of static friction (coefficient of friction through this disclosure) as determined by the procedure and equipment hereafter disclosed between the external common coating material of one ribbon and the external common coating material of another ribbon (ribbon to ribbon) is equal to or less than 0.7. An external common coating includes cases where each ribbon has only one common coating.

The invention also contemplates an optical fiber cable that is composed of a central member, which is usually composed of a stranded strength member circumscribed by a plastic coating. Disposed about this central member is a plurality of individual "U" shaped members in which there is disposed at least one stack of ribbon type subunits. As was the case in slotted core type ribbon cable previously described, the ribbon structure is the same and the ribbon to ribbon coefficient of friction is equal to or less than 0.70.

In all cases, the, coating material may be made of an ultraviolet light curable material having a secant modulus of elasticity in the range of 150 MPa to 1500 MPa inclusive measured at 2.5% strain, the preferred embodiment being in the range of 150 MPa to 300 MPa inclusive. No external sliding agents are needed, allowing the core to be untilled if so desired.

The coating materials may comprise non-fugitive additives to provide the desired low friction coefficient. Non-fugitive additives may include Teflon waxes and polyethylene waxes and combinations thereof. Fugitive additives may include silicone oils and fluorinated oils. Coating materials not requiring additives include silicone acrylates, hybrid silicone-urethane acrylates, and fluorinated backbone acrylates.

DETAILED DESCRIPTION OF THE PREFERRED EMBODIMENT

Figure 1:
FIG. 1 is a cross sectional view of two optical ribbons in a stack.

With reference to FIG. 1, a stack 10 comprises a plurality of optical ribbons 13, 14. A ribbon stack 10 will normally consist of five to twelve such ribbons in contacting relation in a stack, and may include from two to eighteen or more ribbons in a stack. Each ribbon comprises an array of parallel optical fibers 16 each having an individual protective coating 15, and a common coating 12 of ultraviolet light cured material having a secant modulus of elasticity in the range of 150 Mpa to 300 Mpa inclusive measured at 2.5% strain. Coating material 12 is also selected such that the coefficient of static friction at the interface 11 between contacting common coating materials 12 is not greater than about 0.70. Therefore, no external slipping agent is required to be applied to the contacting ribbon coating surfaces 12, although such materials may optionally be applied. Coatings 12 may be selected from the group consisting of silicone acrylates, hybrid silicone-urethane acrylates, and fluorocarbon backbone acrylates, with silicone acrylate material being preferred. Coatings 12 may also contain up to 50% by weight of non-fugitive additives such as Teflon waxes, polyethylene waxes, and combinations thereof. A sample of ribbons each containing sixteen optical fibers and having a thickness of 250 μm having a common coating of a urethane acrylate material mixed with 20% by weight of Teflon powder was found to have an average coefficient of friction of 0.256, with one having a measured coefficient of friction of 0.216.

As an alternative, coatings 12 may comprise 0.5% to 5.0% by weight of fugitive additives, such as silicone oils and fluorinated oils or combinations thereof. As a preferred example of any oil-based fugitive additive, a urethane based acrylate may contain 0.5% to 5.0% by weight of silicone oil. Such materials are available from DSM Desotech, Inc.

Figure 2:
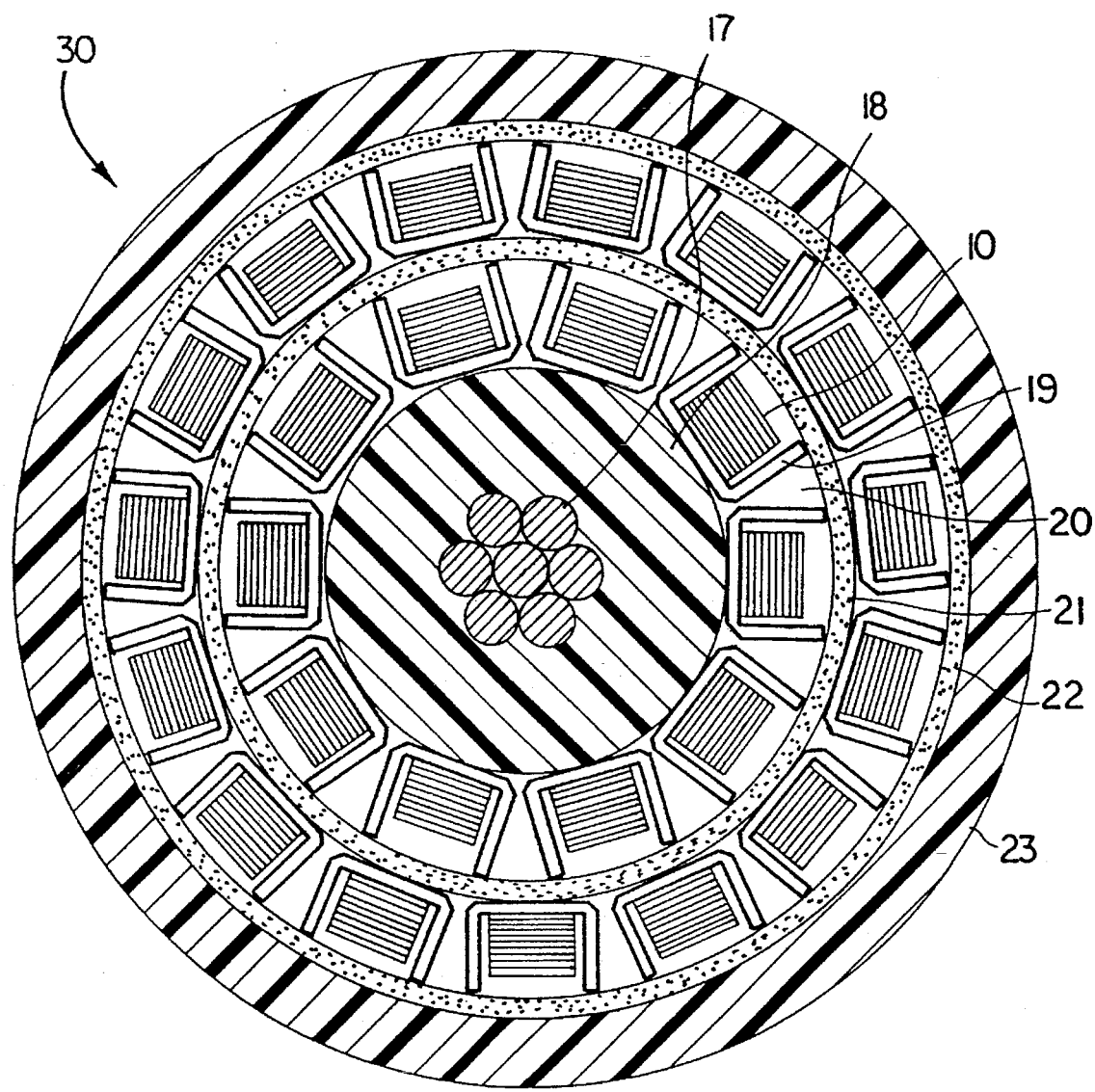
FIG. 2 is a cross sectional view of a U-groove type cable with stacks of optical ribbons.

The ribbon stack 10 as above described may be used in any desired cable design, and is particularly useful in alleviating excess attenuation of corner optical fibers of an optical ribbon stack 10 in stranded designs. FIG. 2 depicts a typical U-groove type cable 30 comprising a core tensile member 17, which may, for example consist of a single wire or stranded torque-balanced metal wires; or single or plural non-metallic strength members, a plastic coating 18 therearound, and one or more layers 20 of U-shaped carriers 19 each containing an optical ribbon stack 10. Between layers 20 is a water-blocking tape 21. An additional water-blocking tape 22 is provided outside the outer layer, and an outer polymer jacket 23 is also provided.

Figure 3:
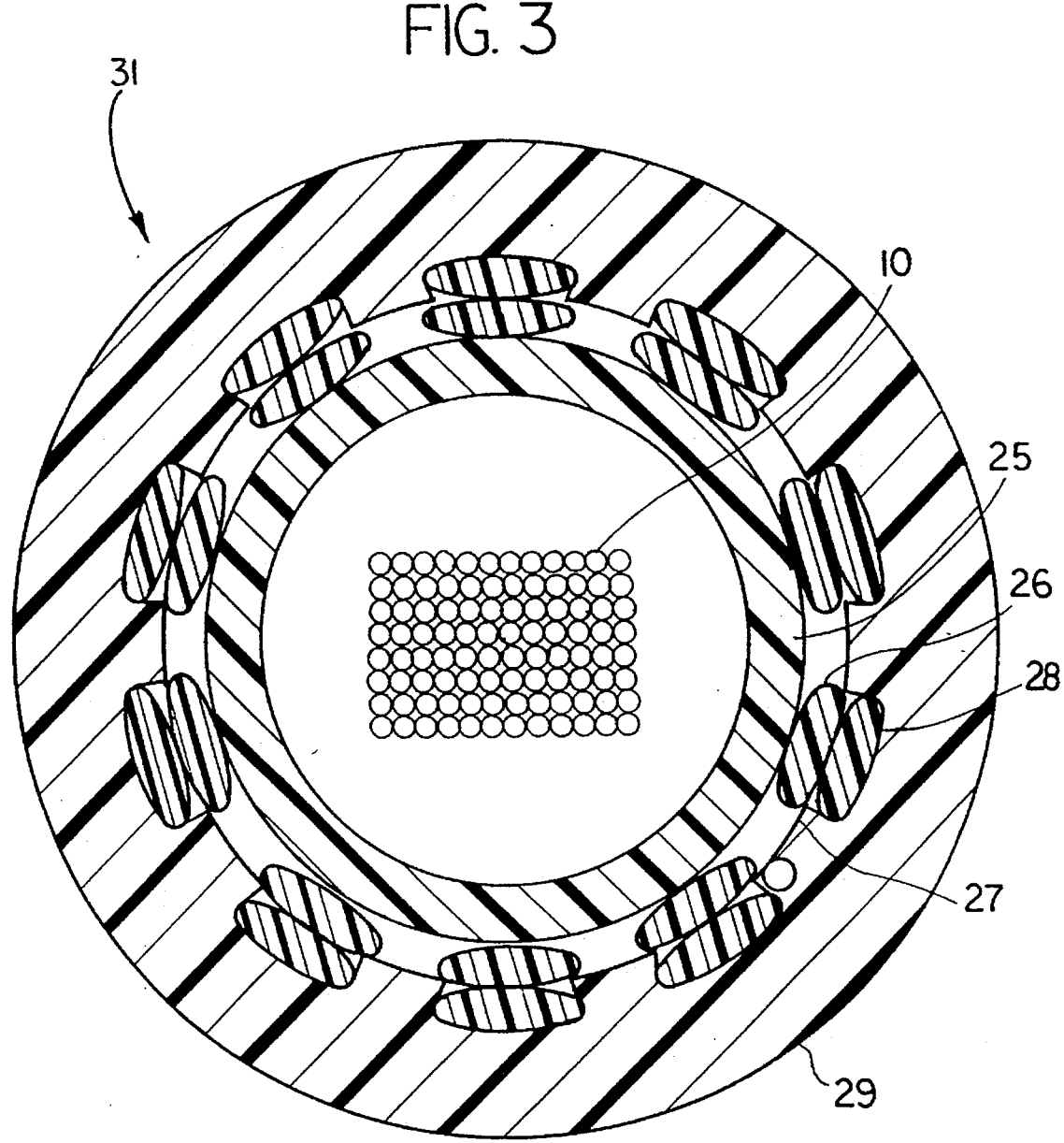
FIG. 3 is a cross sectional view of a single tube type optical cable with a stack of optical ribbons; and, FIG. 4 is a cross sectional view of a slotted core type optical cable with stacks of optical ribbons.

FIG. 3 depicts a single-tube type cable and includes an untilled core including optical ribbon stack 10 in a polymer tube 25, and a strength member system of members 26, 28 with a waterblocking tape 27 therebetween. Outer polymer jacket 29 is pressure extruded over outer strength member layer 28. A cable according to the invention may also contain a plurality of tubes stranded about a central strength member, each tube holding a stack of optical ribbons.

FIG. 4 depicts a slotted core-type cable 32 having a core tensile member 33 consisting of stranded torque-balanced metal wires or other metallic single or plural strength members; a plastic spacer 34 extruded therearound having slots 35 therein, and optical ribbon stacks 10 deposited in one or a plurality of the slots 35. Member 36 in a slot may be a water-absorptive thread, an electrical communications member, or other cable component as desired. Surrounding the core is water swellable tape 37, inner polyethylene jacket 38, steel armor tape 39, and outer polymer jacket 40.

An Instron Tensile Tester may be used for determining the ribbon-to-ribbon coefficient of static friction. Contamination-free specimens are tested using the smallest capacity load cell possible, to give the greatest resolution. A first length of ribbon coating material is secured in a single layer around a mandrel. The disk-shaped mandrel and its accompanying holder are attached to an overhead load cell. The first end of a second length of ribbon coating material is placed in clamps to be immobile. The second length of ribbon coating material must be long enough to allow 50 mm of unobstructed travel during testing. The length of second ribbon is draped over the first length of ribbon such that the bottom surface of the second ribbon is placed so as to be in contact with the top surface of the first ribbon. A weight of mass $M_w$ is suspended from the second end of the second length of ribbon coating material. The mandrel is then raised at a constant speed, causing the second length of ribbon coating material to slide over the first length of ribbon coating material. The coefficient of static friction μ is found to equal $(1/\pi) \ln \{[(F_D/(M_w g)] - 1\}$, where $M_w g$ is the force due to gravity applied to the second end of the second length of ribbon coating material and $F_D$ is the peak tension measured. The peak tension occurs just before the second length of ribbon coating material begins to move relative to the first length of ribbon coating material.

What is claimed is:

1. An optical ribbon cable, comprising:
   a cable holding a stack of at least two optical ribbons in contacting relation, each optical ribbon comprising a plurality of optical fibers with an external common coating of ultraviolet light cured material, said common coating materials having a coating material to coating material coefficient of friction not greater than about 0.70.

2. An optical cable as recited in claim 1, wherein said coefficient of friction is not greater than 0.40.

3. An optical ribbon cable as recited in claim 1, wherein the ribbon stack is located in a cable core tube.

4. An optical cable as recited in claim 1 wherein the ribbon coatings are selected from the group consisting of silicone acrylates, hybrid silicone-urethane acrylates, and fluorocarbon backbone acrylates.

5. An optical cable as recited in claim 1 wherein the ribbon coatings comprise non-fugitive additives.

6. An optical cable as recited in claim 1 wherein the ribbon coatings comprise fugitive additives.

7. An optical ribbon cable as recited in claim 1, further comprising a central member.

8. An optical ribbon cable as recited in claim 7, wherein the ribbon stack is located in a groove in the outer surface of the central member.

9. An optical ribbon cable as recited in claim 7, wherein the ribbon stack is located in a "U" shaped carrier disposed about the central member.

10. An optical ribbon cable, comprising:
    a cable holding a stack of at least two optical ribbons in contacting relation, each optical ribbon comprising a plurality of optical fibers with an external common coating of material having a secant modulus of elasticity in the range of 150 MPa to 300 MPa inclusive measured at 2.5% strain, said common coating materials having a coating material to coating material coefficient of friction not greater than about 0.70.

11. An optical cable as recited in claim 10, wherein said common coatings are made of ultraviolet light-cured material.

12. An optical ribbon cable as recited in claim 10, wherein the ribbon stack is located in a cable core tube.

13. An optical cable as recited in claim 10 wherein the ribbon coatings are selected from the group consisting of silicone acrylates, hybrid silicone-urethane acrylates, and fluorocarbon backbone acrylates.

14. An optical cable as recited in claim 10 wherein the ribbon coatings comprise non-fugitive additives.

15. An optical cable as recited in claim 10 wherein the ribbon coatings comprise fugitive additives.

16. An optical ribbon cable as recited in claim 10, further comprising a central member.

17. An optical ribbon cable as recited in claim 16, wherein the ribbon stack is located in a groove in the outer surface of the central member.

18. An optical ribbon cable as recited in claim 16, wherein the ribbon stack is located in a "U" shaped carder disposed about the central member.

19. An optical ribbon cable, comprising:

a cable holding stack of at least two optical ribbons in contacting relation, each optical ribbon comprising a plurality of optical fibers with an external common coating of material having a secant modulus of elasticity greater than 150 MPa and less that 1500 MPa inclusive measured at 2.5% strain, said common coating materials having a coating material to coating material coefficient of friction not greater than about 0.70.

20. An optical cable as recited in claim 19, wherein said coefficient of friction is less than 0.40.

21. A fiber optic ribbon cable, comprising a stack of optical fiber ribbons, with the outer surface of each optical fiber ribbon contacting the outer surface of at least one other optical fiber ribbon, each ribbon comprising a plurality of individually coated optical fibers in a planar relationship one to another and coated by a single layer of a common coating formed of an ultraviolet light-cured material which forms the outer surface of such ribbon, the static coefficient of friction between contacting common coating layers being less than or equal to 0.70.

22. A method of determining the static coefficient of friction between contacting plastic ribbons each containing optical fibers, comprising securing a first such ribbon to a mandrel, securing a mass $M_w$ to a first end of a second such ribbon and immobilizing a second end of the second such ribbon, sliding the second such ribbon over the first such ribbon to determine a peak tension $F_D$, and calculating the static coefficient of friction $\mu$ from the formula $\mu=(1/\pi) \ln \{[(F_D/(M_w\ g)]-1]\}$.

* * * * *